United States Patent
Liu

(10) Patent No.: US 6,523,848 B1
(45) Date of Patent: Feb. 25, 2003

(54) BICYCLE SUPPORTIVE WHEEL MOUNTING STRUCTURE

(76) Inventor: Ssu-Liu Liu, 2F., No. 44, Lane 11, Kwang Fu N. Rd., Taipei (TW)

( * ) Notice: Subject to any disclaimer, the term of this patent is extended or adjusted under 35 U.S.C. 154(b) by 0 days.

(21) Appl. No.: 09/953,861

(22) Filed: Sep. 18, 2001

(51) Int. Cl.⁷ ................................................. B62H 1/00
(52) U.S. Cl. ....................................... 280/293; 280/767
(58) Field of Search ................................. 280/293, 767

(56) References Cited

U.S. PATENT DOCUMENTS 4,133,402 A * 1/1979 Soo Hoo .................... 180/209
4,779,886 A * 10/1988 Ehrlich ....................... 280/293

* cited by examiner

*Primary Examiner*—Lesley D. Morris
*Assistant Examiner*—L. Lum
(74) *Attorney, Agent, or Firm*—Varndell & Varndell, PLLC

(57) ABSTRACT

A bicycle supportive wheel mounting structure, in which the wheel holder frame, which is fixedly fastened to the seat stays and chain stays of a bicycle to hold a supportive wheel at one side of the bicycle's rear wheel, has two braces connected between the flat mounting base and horizontal bar there and a reinforcing plate welded to the horizontal bar and one supportive wheel coupling fork at the horizontal bar and one of the braces to reinforce the structural strength.

3 Claims, 4 Drawing Sheets

BICYCLE SUPPORTIVE WHEEL MOUNTING STRUCTURE

BACKGROUND AND SUMMARY OF THE INVENTION

The present invention relates to bicycles and, more particularly, to a bicycle supportive wheel mounting structure adapted to hold a supportive wheel at each side of the rear wheel of a bicycle.

In order to let an old or disabled person ride a bicycle, supportive wheels may be sued and directly fastened to the wheel axle of the bicycle's rear wheel. However, this supportive wheel mounting method is not suitable for all bicycles. In order to eliminate this problem, various bicycle supportive wheel mounting designs are developed. Exemplars of bicycle supportive wheel mounting designs are seen in U.S. Pat. Nos. 2,647,764 and 4,779,866. However, these designs are less strong.

It is one object of the present invention to provide a bicycle supportive wheel mounting structure, which is durable and stable in use. It is another object of the present invention to provide a bicycle supportive wheel mounting structure, which provides a buffering effect during movement of the supportive wheel with the bicycle. According to one aspect of the present invention, the wheel holder frame, which is fixedly fastened to the seat stays and chain stays of a bicycle to hold a supportive wheel at one side of the bicycle's rear wheel, has two braces connected between the flat mounting base, which is fixedly fastened to the bicycle frame, and the horizontal bar, which is integral with an outer downward fork and an inner downward fork to hold the supportive wheel, and a reinforcing plate welded to the horizontal bar and the inner downward fork and one of the braces to reinforce the structural strength. According to another aspect of the present invention, the wheel holder frame has a smoothly arched turn formed integral with and connected between the horizontal bar and the outer downward fork to provide a buffering effect upon movement of the supportive wheel with the bicycle.

DETAILED DESCRIPTION OF THE PREFERRED EMBODIMENT

Figure 1:
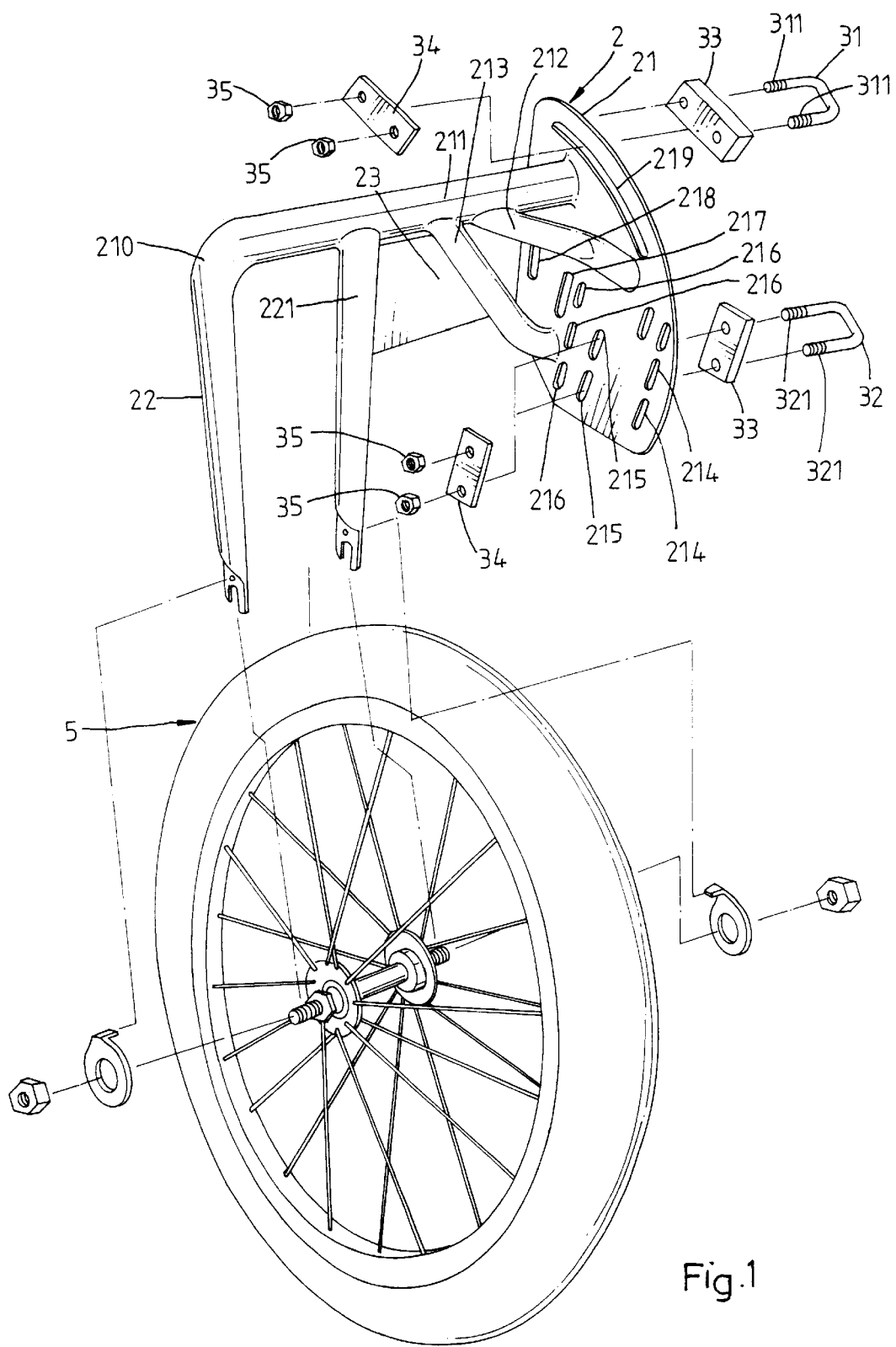
FIG. 1 is an exploded view of a bicycle supportive wheel mounting structure according to the present invention.
Figure 2:
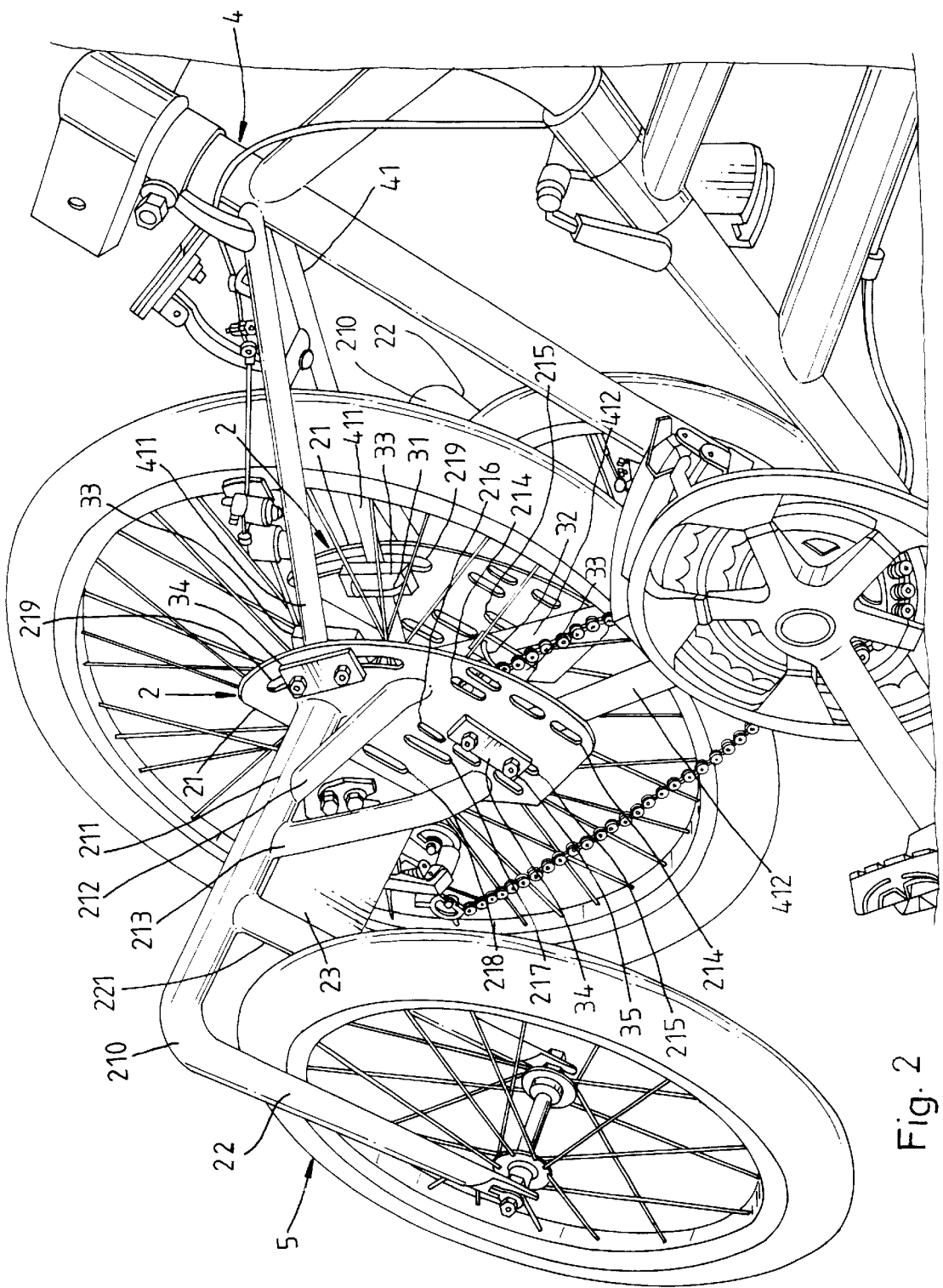
FIG. 2 is an elevational view of the present invention showing the bicycle supportive wheel mounting structure installed in the seat stays and chain stays of a bicycle.
Figure 3:
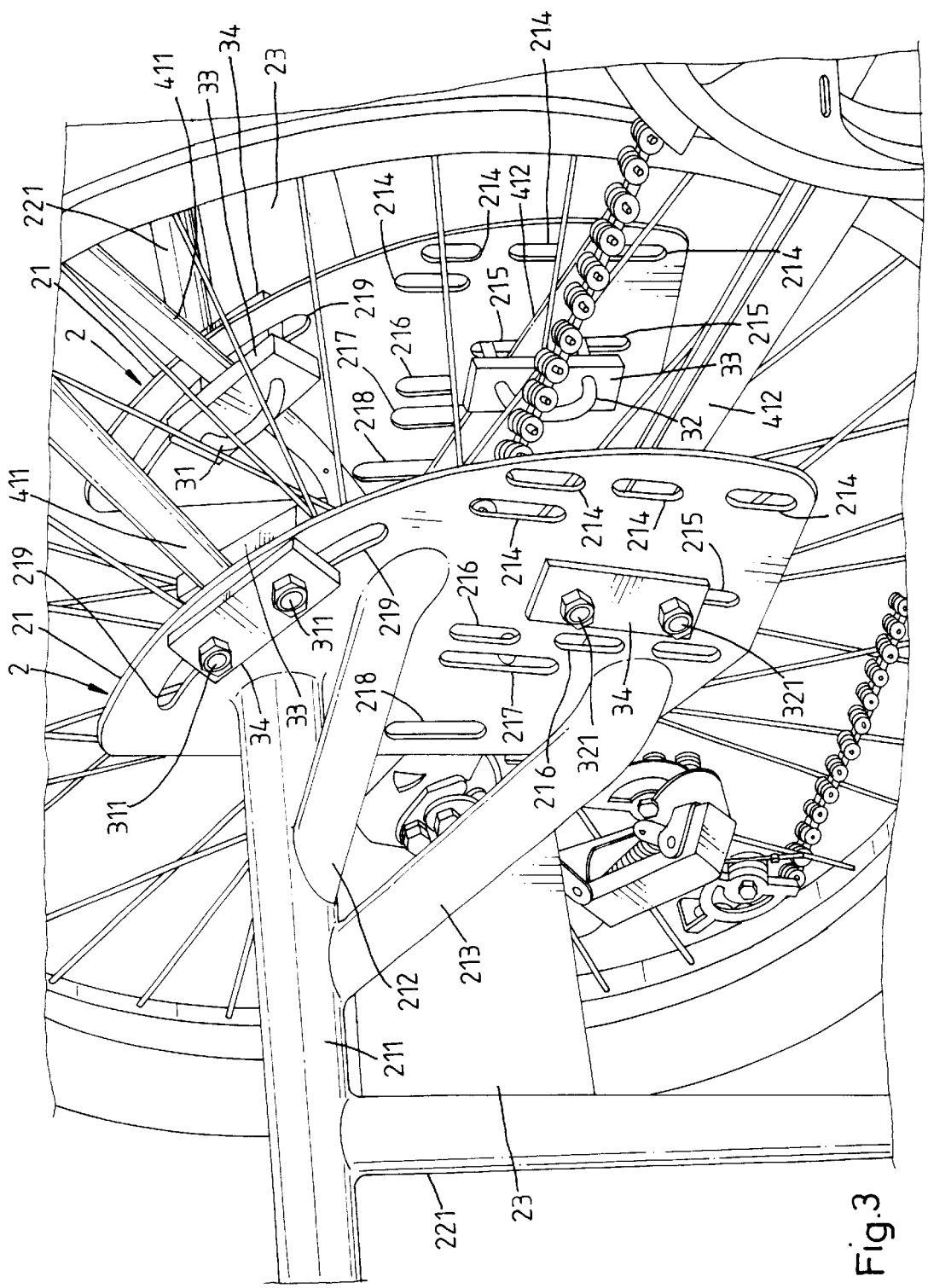
FIG. 3 is an enlarged view of a part of FIG. 2.
Figure 4:
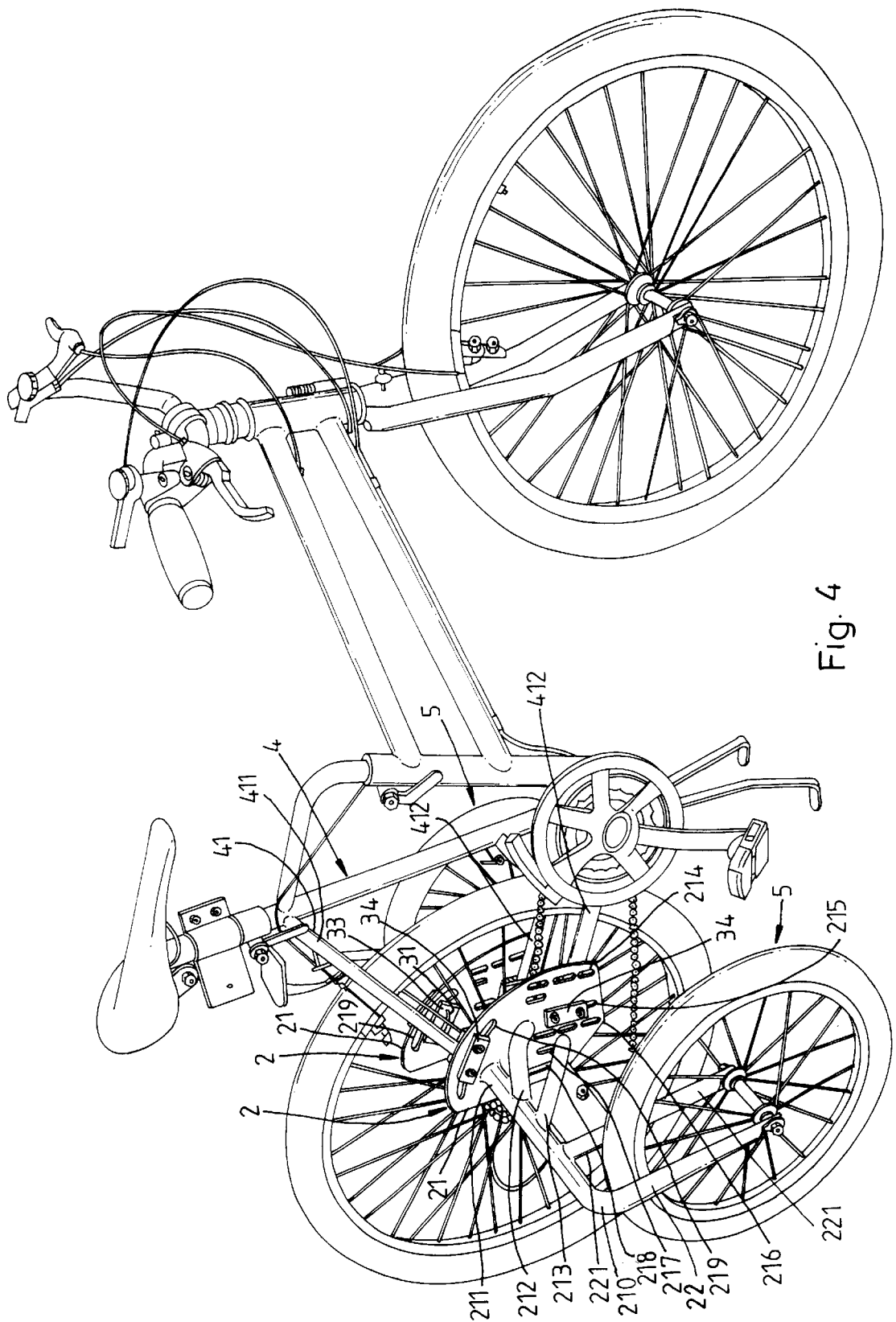
FIG. 4 is an elevational view of a bicycle embodying the present invention.

Referring to FIGS. 1 through 4, two wheel holder frames 2 are respectively fastened to the seat stays 411 and chain stays 412 of the rear fork unit 41 of a bicycle frame 4 by respective first and second shackles 31 and 32, gasket pads 33 and 34 and nuts 35 to hold a respective supportive wheel 5, forming with the bicycle a four-wheel bicycle for an aged or disabled user.

The wheel holder frame 2 comprises a vertically disposed flat mounting base 21. The flat mounting base 21 has an elongated, smoothly arched mounting slot 219 disposed at an upper side for fastening to one seat stay 411 of the rear fork unit 41 of the bicycle frame 4 by the first shackle 31 and the respective gasket pads 33 and 34 and nuts 35, and a plurality of mounting holes 214, 215, 216, 217, 218 of different sizes disposed at a lower side for fastening to one chain stay 412 of the rear fork unit 41 of the bicycle frame 4 by the second shackle 32 and the respective gasket pads 33 and 34 and nuts 35. The first shackle 31 has two threaded end pieces 311 respectively inserted through respective through holes of the respective gasket pads 33 and 34 and the elongated, smoothly arched slot 219 of the flat mounting base 21 at two sides of the corresponding seat stay 411 and then fastened up with the respective nuts 35 to fixedly secure the flat mounting base 21 to the corresponding seat stay 411. The second shackle 32 has two threaded end pieces 321 selectively inserted through the mounting holes 214, 215, 216, 217, 218 of the flat mounting base 21 and respective through holes of the respective gasket pads 33 and 34 at two sides of the corresponding chain stay 412 and then fastened up with the respective nuts 35 to fixedly secure the flat mounting base 21 to the corresponding seat stay 411. Because the mounting slot 219 is an elongated, smoothly arched slot, it fits the seat stays of any of a variety of bicycles. Because the mounting holes 214, 215, 216, 217, 218 of the flat mounting base 21 are disposed at different locations and have different sizes, the flat mounting base 21 fits the chain stays of any of a variety of bicycles.

The wheel holder frame 2 further comprises a horizontal bar 211 perpendicularly extended from one side of the flat mounting base 21, an outer downward fork 22 downwardly extended from the end of the horizontal bar 211, a smoothly arched turn 210 connected between the horizontal bar 211 and the outer downward fork 22, an inner downward fork 221 downwardly extended from the horizontal bar 211 and spaced between the outer downward fork 22 and the flat mounting base 21 and coupled with the outer downward fork 22 to the ends of the wheel axle of the respective supportive wheel 5, two braces 212 and 213 connected between the horizontal bar 211 and the flat mounting base 21 at different angles, and a reinforcing plate 23 welded to the horizontal bar 211, one brace 213, and the inner downward fork 221.

As indicated above, the wheel holder frame 2 has two braces 212 and 213 connected between the horizontal bar 211 and the flat mounting base 21 and a reinforcing plate 23 welded to the horizontal bar 211, one brace 213 and the inner downward fork 221, the wheel holder frame 2 has a high structural strength. Further, the smoothly arched turn 210 of the wheel holder frame 2 imparts a buffering effect against vibration during running of the supportive wheel 5.

A prototype of bicycle supportive wheel mounting structure has been constructed with the features of FIGS. 1~4. The bicycle supportive wheel mounting structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A bicycle supportive wheel mounting structure comprising a supportive wheel having a wheel axle, a wheel holder frame holding said supportive wheel, said wheel holder frame comprising a flat mounting base, and fastening means fastened to said flat mounting base of said wheel holder frame to fixedly secure said wheel holder frame to seat stays and chain stays of a frame of a bicycle, wherein said wheel holder frame comprises a horizontal bar perpendicularly extended from one side of said flat mounting base, said horizontal bar having a first end integral with said flat mounting base and a second end, an outer downward fork downwardly extended from the second end of said horizontal bar, an inner downward fork downwardly extended from said horizontal bar and spaced between said outer downward fork and said flat mounting base and coupled with said outer downward fork to the ends of the wheel axle of said supportive wheel, and two braces connected between said horizontal bar and said flat mounting base at different angles.

2. The bicycle supportive wheel mounting structure as claimed in claim 1 wherein said wheel holder frame further comprises a reinforcing plate welded to said horizontal bar and said inner downward fork and one of said braces.

3. The bicycle supportive wheel mounting structure as claimed in claim 1 wherein said wheel holder frame further comprises a smoothly arched turn formed integral with and connected between said horizontal bar and said outer downward fork.

* * * * *